(12) United States Patent
Kannan et al.

(10) Patent No.: US 9,971,537 B1
(45) Date of Patent: May 15, 2018

(54) HARDWARE SUPPORT TO TRACK AND TRANSITION FLASH LUNS INTO SLC MODE

(71) Applicant: Pure Storage, Inc., Mountain View, CA (US)

(72) Inventors: Hari Kannan, Mountain View, CA (US); Robert Lee, Mountain View, CA (US); Randy Zhao, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days. days.

(21) Appl. No.: 15/335,135

(22) Filed: Oct. 26, 2016

(51) Int. Cl.
*G06F 3/06* (2006.01)

(52) U.S. Cl.
CPC ............ *G06F 3/0634* (2013.01); *G06F 3/061* (2013.01); *G06F 3/064* (2013.01); *G06F 3/0635* (2013.01); *G06F 3/0653* (2013.01); *G06F 3/0688* (2013.01)

(58) Field of Classification Search
CPC ...... G06F 3/0634; G06F 3/0653; G06F 3/064; G06F 3/0688; G06F 3/061; G06F 3/0635
See application file for complete search history.

(56) References Cited

U.S. PATENT DOCUMENTS

| | | | | |
|---|---|---|---|---|
| 6,075,723 A * | 6/2000 | Naiki | ................. | G11C 11/5628 365/185.01 |
| 7,646,636 B2 * | 1/2010 | Kim | ..................... | G06F 12/0246 365/168 |
| 8,054,686 B2 * | 11/2011 | Yeh | ...................... | G06F 12/0246 365/185.03 |
| 8,478,947 B2 * | 7/2013 | Ingram | ............... | G06F 13/1694 711/154 |
| 8,644,065 B2 * | 2/2014 | Roohparvar | ........ | G11C 11/5621 365/185.03 |
| 2015/0169228 A1 * | 6/2015 | Sivasankaran | ........ | G06F 3/0625 711/103 |
| 2016/0019160 A1 * | 1/2016 | Mohan | ................ | G06F 12/0246 711/208 |
| 2016/0313928 A1 * | 10/2016 | Chun | ..................... | G06F 3/0616 |
| 2017/0047124 A1 * | 2/2017 | Ellis | ....................... | G11C 16/10 |

* cited by examiner

*Primary Examiner* — Vanthu Nguyen
(74) *Attorney, Agent, or Firm* — Womble Bond Dickinson (US) LLP

(57) ABSTRACT

A method for tracking and transitioning flash memory modes, performed by a storage system, is provided. The method includes tracking memory modes of a plurality of portions of flash memory, on a per portion basis, in a data structure in a first memory and determining, based on the data structure, whether the tracked memory mode of a portion of flash memory matches a memory mode for an I/O (input/output) command relating to the flash memory. The method includes sending at least one command to the flash memory to change the memory mode of the portion of flash memory, responsive to determining the tracked memory mode does not match the memory mode for the I/O command, and performing the I/O command with the memory mode of the portion of flash memory changed to match the memory mode for the I/O command.

20 Claims, 10 Drawing Sheets

HARDWARE SUPPORT TO TRACK AND TRANSITION FLASH LUNS INTO SLC MODE

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory.

Flash memories that can operate in single level cell (SLC) mode or one or more types of multilevel cell (MLC) mode such as two bits per cell, three bits per cell (also known as triple level cell or TLC, a type of MLC) or four bits per cell (also known as quad level cell or QLC, a further type of MLC) place the burden of managing flash memory mode onto the flash controller. State transitions to switch back and forth between flash memory modes can impact storage system performance. It is within this context that the embodiments arise.

SUMMARY

In some embodiments, a method for tracking and transitioning flash memory modes, performed by a storage system, is provided. The method includes tracking memory modes of a plurality of portions of flash memory, on a per portion basis, in a data structure in a first memory and determining, based on the data structure, whether the tracked memory mode of a portion of flash memory matches a memory mode for an I/O (input/output) command relating to the flash memory. The method includes sending at least one command to the flash memory to change the memory mode of the portion of flash memory, responsive to determining the tracked memory mode does not match the memory mode for the I/O command, and performing the I/O command with the memory mode of the portion of flash memory changed to match the memory mode for the I/O command.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
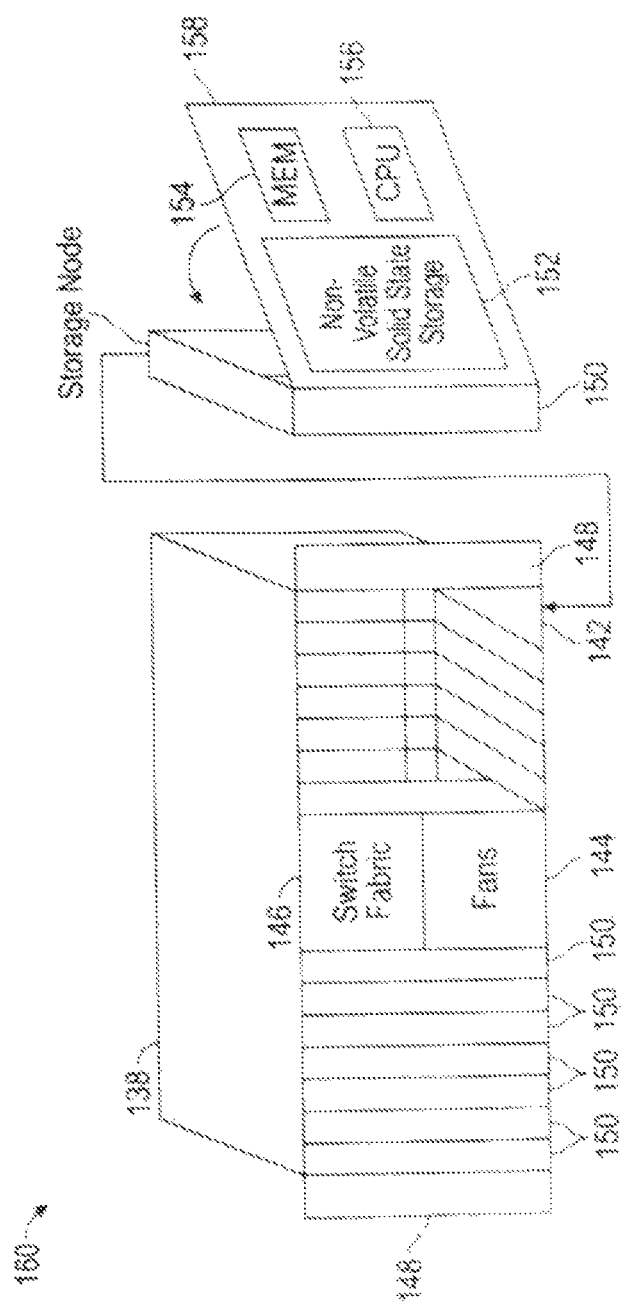
FIG. 1 is a perspective view of a storage cluster with multiple storage nodes and internal storage coupled to each storage node to provide network attached storage, in accordance with some embodiments.

Embodiments of a storage cluster or storage system described herein manage flash memory mode through the use of various data structures and combinations of software executing on processors, hardware and firmware. Flash memory that supports single level cell (SLC) and one or more types of multilevel cell (MLC) flash modes gives storage systems flexibility to trade off memory data density, reliability and system costs, which can be tailored to user preferences and system needs. Reliability of single cell flash memory is superior to reliability of various types of multi-level cell flash memory. Systems may make use of this property to store mission-critical data in single level cell flash memory, and other data in various types of multilevel cell flash memory. The burden of managing flash memory mode is placed on the flash memory controller. In some embodiments described herein, individual blocks of flash memory can be written to or read from in a single level cell or multilevel cell mode, but the flash memory itself is operated in terms of logical unit numbers (LUNs) and flash memory mode. The controller is responsible for transitioning the entire LUN from one flash mode to another, performing reads, writes or erases to one or more blocks, and then moving the LUN to another flash mode. These state transitions often involve long command sequences, which can impact performance if software needs to be involved at every step.

In embodiments described with reference to FIGS. 6-9, which make use of components and system architecture from embodiments described with reference to FIGS. 1-5, a flash memory controller keeps track of the state of the LUN in hardware (e.g., in a data structure and state machine, or alternatively in fast-running firmware in a field programmable gate array or programmable logic device), and transitions the state as appropriate. The advantage of doing so in hardware is performance, since the system does not need to involve firmware or software in a processor outside of the storage controller in the critical path of what could be a fairly common operation. One version of the storage system splits responsibilities as follows: software, in a storage node, i.e., external to the flash controller in a storage unit with flash memory, is responsible for identifying if a block being accessed is in single level cell or some multilevel cell mode, and hardware, e.g. data structure, state machine or firmware in or associated with the flash controller is responsible for transitioning the state of the LUN as appropriate. Additionally, at the time of performing a software reset or a hardware power down, the flash controller is responsible for transitioning the LUNs back to a known good state (e.g. single level cell, or one of the multilevel cell modes, as appropriate).

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

Various system aspects are discussed below with reference to FIGS. 1-3. is described with reference to FIGS. 4-6.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
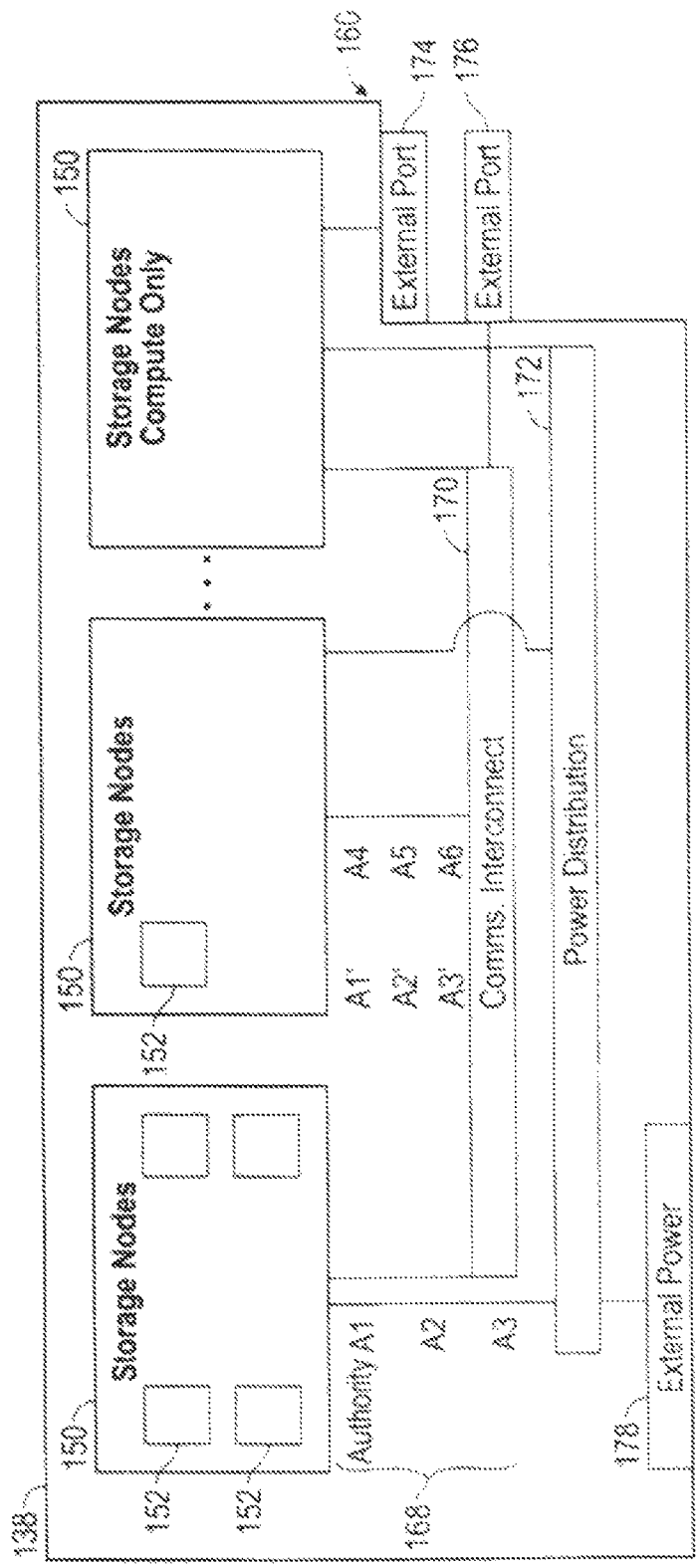
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1 and 2, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain metadata, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 3:
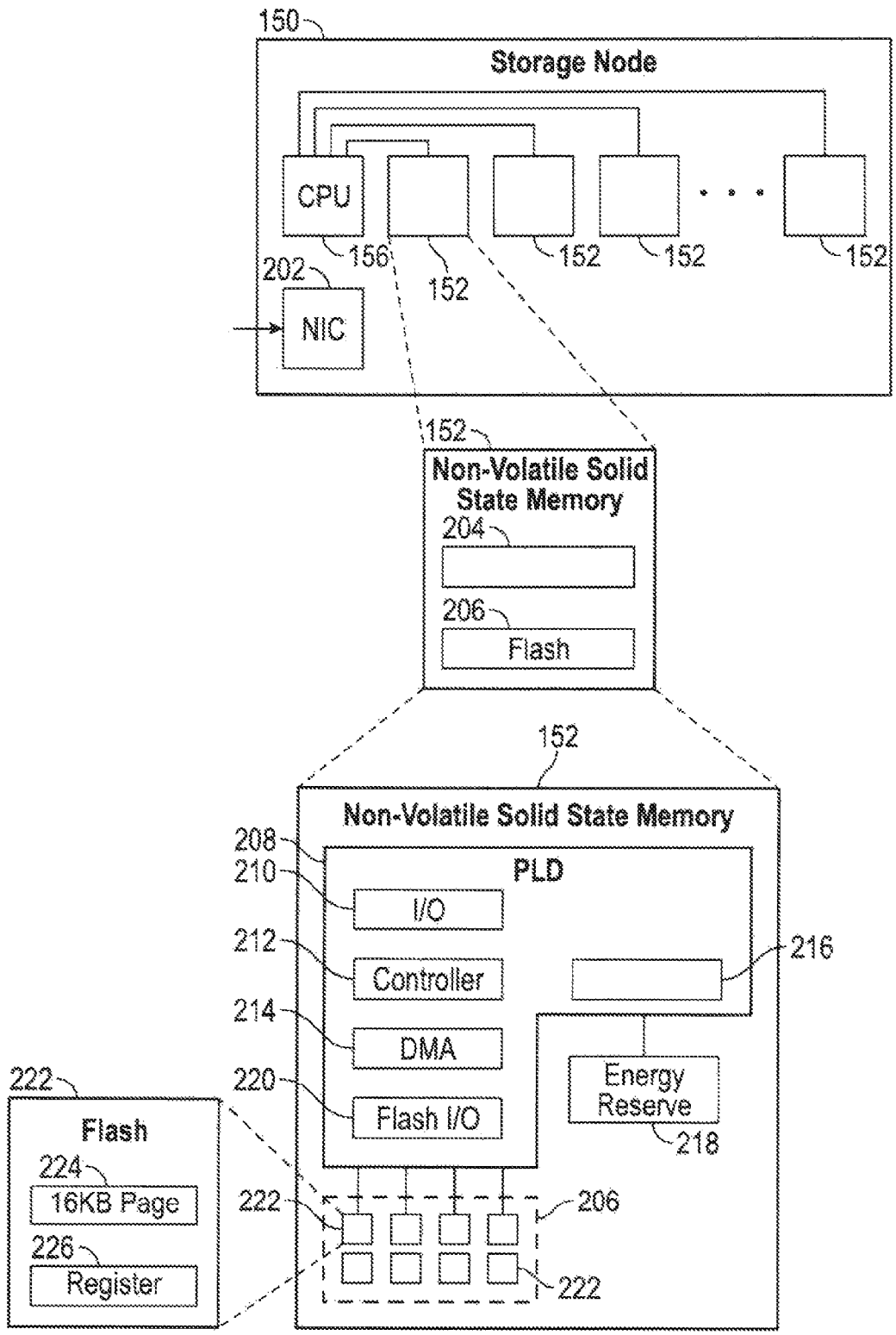
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 4:
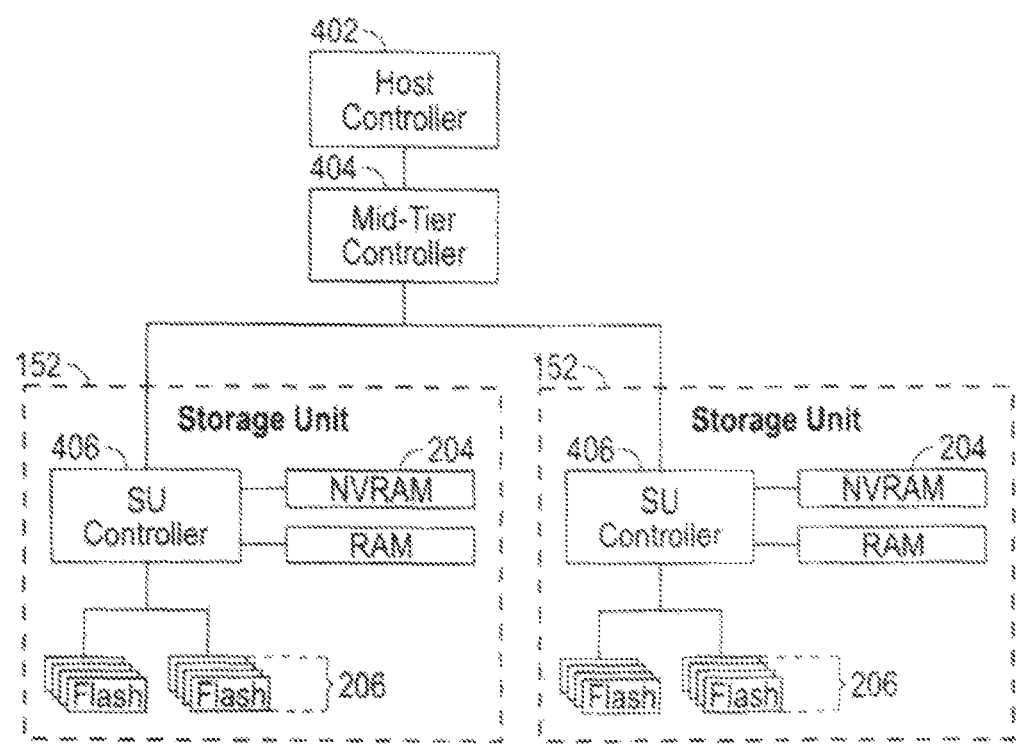
FIG. 4 shows a storage server environment, which uses embodiments of the storage nodes and storage units of FIGS. 1-3 in accordance with some embodiments.

FIG. 4 shows a storage server environment, which uses embodiments of the storage nodes 150 and storage units 152 of FIGS. 1-3. In this version, each storage unit 152 has a processor such as controller 212 (see FIG. 3), an FPGA (field programmable gate array), flash memory 206, and NVRAM 204 (which is super-capacitor backed DRAM 216, see FIGS. 2 and 3) on a PCIe (peripheral component interconnect express) board in a chassis 138 (see FIG. 1). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 512 independently. Each device provides an amount of storage space to each authority 512. That authority 512 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 512. This distribution of logical control is shown in FIG. 4 as a host controller 402, mid-tier controller 404 and storage unit controller(s) 406. Management of the control plane and the storage plane are treated independently, although parts may be physically co-located on the same blade. Each authority 512 effectively serves as an independent controller. Each authority 512 provides its own data and metadata structures, its own background workers, and maintains its own lifecycle.

Figure 5:
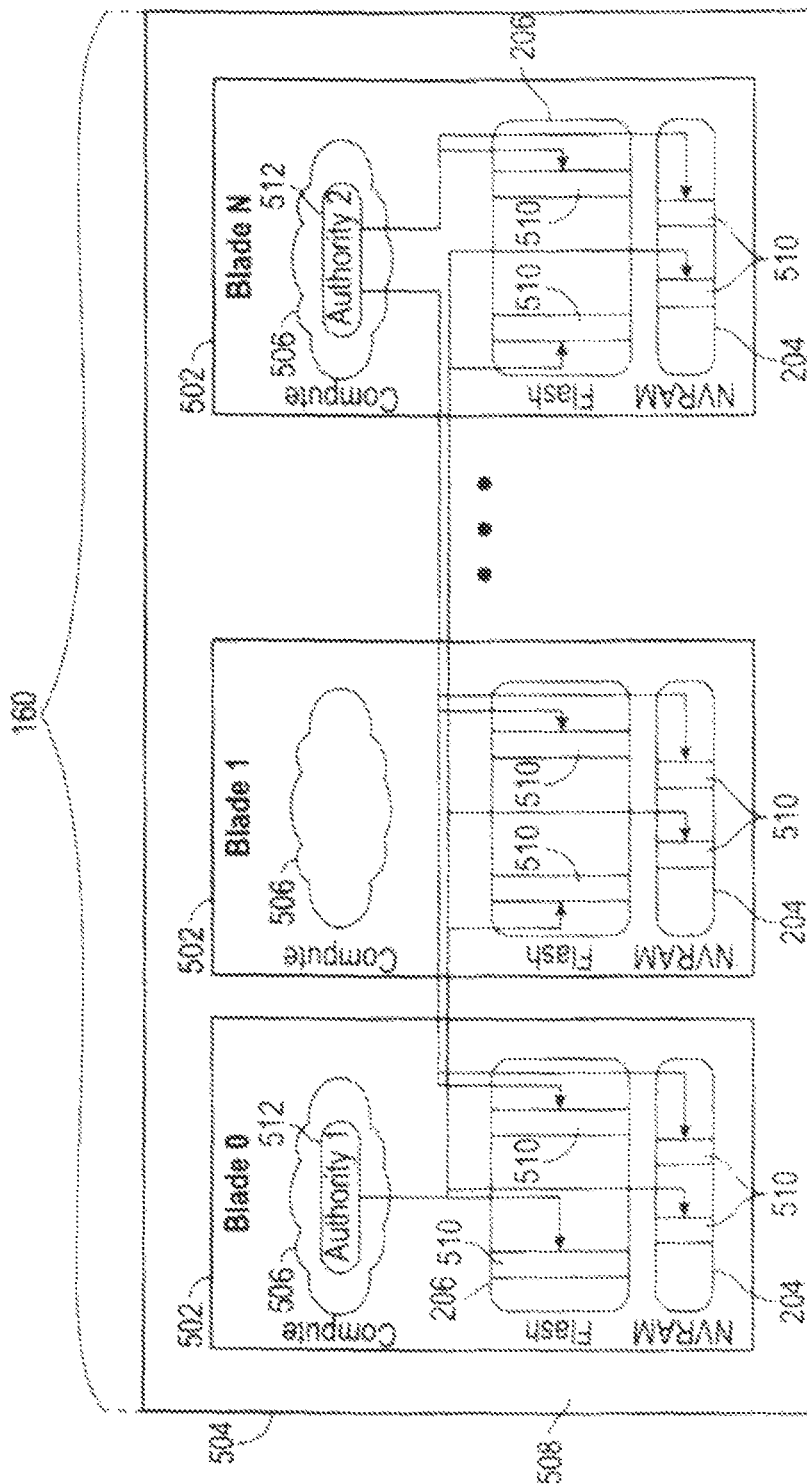
FIG. 5 is a blade hardware block diagram, showing a control plane, compute and storage planes, and authorities interacting with underlying physical resources, in accordance with some embodiments.

FIG. 5 is a blade 502 hardware block diagram, showing a control plane 504, compute and storage planes 506, 508, and authorities 512 interacting with underlying physical resources, using embodiments of the storage nodes 150 and storage units 152 of FIGS. 1-3 in the storage server environment of FIG. 4. The control plane 504 is partitioned into a number of authorities 512 which can use the compute resources in the compute plane 506 to run on any of the blades 502. The storage plane 508 is partitioned into a set of devices, each of which provides access to flash 206 and NVRAM 204 resources.

In the compute and storage planes 506, 508 of FIG. 5, the authorities 512 interact with the underlying physical resources (i.e., devices). From the point of view of an authority 512, its resources are striped over all of the physical devices. From the point of view of a device, it provides resources to all authorities 512, irrespective of where the authorities happen to run.

Each authority 512 has allocated or has been allocated one or more partitions 510 of storage memory in the storage units 152, e.g. partitions 510 in flash memory 206 and NVRAM 204. Each authority 512 uses those allocated partitions 510 that belong to it, for writing or reading user data. Authorities can be associated with differing amounts of physical storage of the system. For example, one authority 512 could have a larger number of partitions 510 or larger sized partitions 510 in one or more storage units 152 than one or more other authorities 512.

Figure 6:
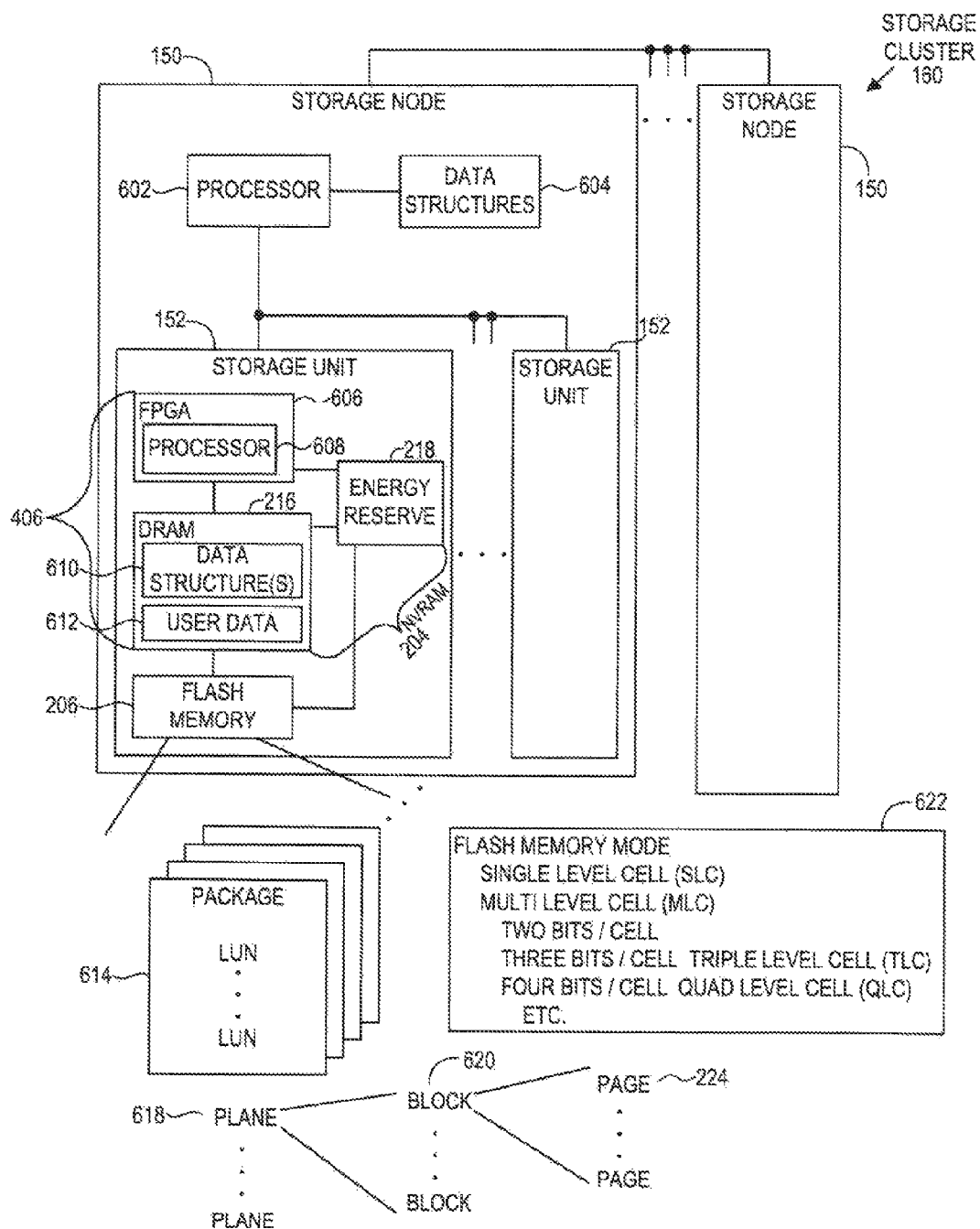
FIG. 6 is a system block diagram showing storage nodes and storage units in a storage cluster, with data structures that are used for managing flash memory mode in portions of flash memory in accordance with some embodiments.

FIG. 6 is a system block diagram showing storage nodes 150 and storage units 152 in a storage cluster 160, with data structures 604, 610 that are used for managing flash memory mode 622 in portions of flash memory 206. Flash memory 206 is organized as multiple packages 614 of flash memory. Each package has multiple logical unit numbers (LUNs) 616. Each LUN 616 has multiple planes 618. Each plane 618 has multiple blocks 620. Each block has multiple pages 224 of flash memory. The storage cluster 160, and further embodiments of various storage systems including further storage clusters, manage flash memory mode 622 using one or more data structures 604, 610, and set flash memory mode 622 to single level cell or one or more types of multilevel cell for various portions of flash memory 206. Multilevel cell mode for flash memory could be two bits per cell, three bits per cell (also known as triple level cell or TLC), four bits per cell (also known as quad level cell or QLC), or more bits per cell in further embodiments.

Problems or challenges arise from a mismatch in granularity between how the flash memory 206 supports flash memory mode 622 and how the storage system accesses data in flash memory. In many storage systems, including various embodiments herein, flash memory is read in pages 224, and erased in blocks 620, but the flash memory 206 packages 614 have each LUN 616 at a specified flash memory mode 622, and require the flash controller to manage flash memory mode 622 at the level of LUNs 616. Flash memory manufacturers enforce this through the API (application programming interface).

A solution described herein for the above problems or challenges is to have one data structure 604 keeping track of flash memory mode 622 for one level of portions of flash memory 206, for example the block level, and another data structure 610 keeping track of flash memory mode 622 for another level of portions of flash memory 206, for example the LUN level. One or more processors 602, 608 in the storage system performing an I/O operation on a flash memory location in a block 620 can access these data structures 604, 610, and compare the desired flash memory mode 622 for the block level (or other level in further embodiments) to the flash memory mode 622 in which the LUN 616 (or other level in further embodiments) for that block 620 is presently operating. If the desired flash memory mode 622 for the flash memory location in the block 620 matches the present status of the flash memory mode 622 for the LUN 616, the I/O operation can proceed without need of changing the flash memory mode 622 for the LUN 616. If the desired flash memory mode 622 for the flash memory location in the block 620 differs from (i.e., does not match) the present state of the flash memory mode 622 for the LUN 616, the processor(s) 602, 608 direct the flash memory 206 to change the flash memory mode 622 for the specified LUN 616 to the specified flash memory mode 622. These actions are further described below with reference to FIG. 7.

In the embodiment shown in FIG. 6, the processor 602 of the storage node 150 tracks the flash memory mode 622 of blocks in a data structure 604, for example in memory coupled to the processor 602. The processor 608 of the storage unit 152, for example a processor 608 in an FPGA 606 or other PLD 208 (see FIG. 3) tracks the flash memory mode 622 of LUNs 616. This is tracked in a data structure 610, for example in NVRAM 204 implemented as DRAM 216 supported by an energy reserve 218, coupled to the processor 608 in the storage unit 152. In various embodiments, the DRAM 216 could be integral with the FPGA 606, or coupled to the FPGA 606, or implemented in further variations readily devised in keeping with the teachings herein. DRAM 216 also holds user data 612 on the way to being striped across the flash memory 206 in the storage nodes, and metadata (not shown, but see above description with reference to FIGS. 1-4) relating to user data 612 and various system operations.

Figure 7:
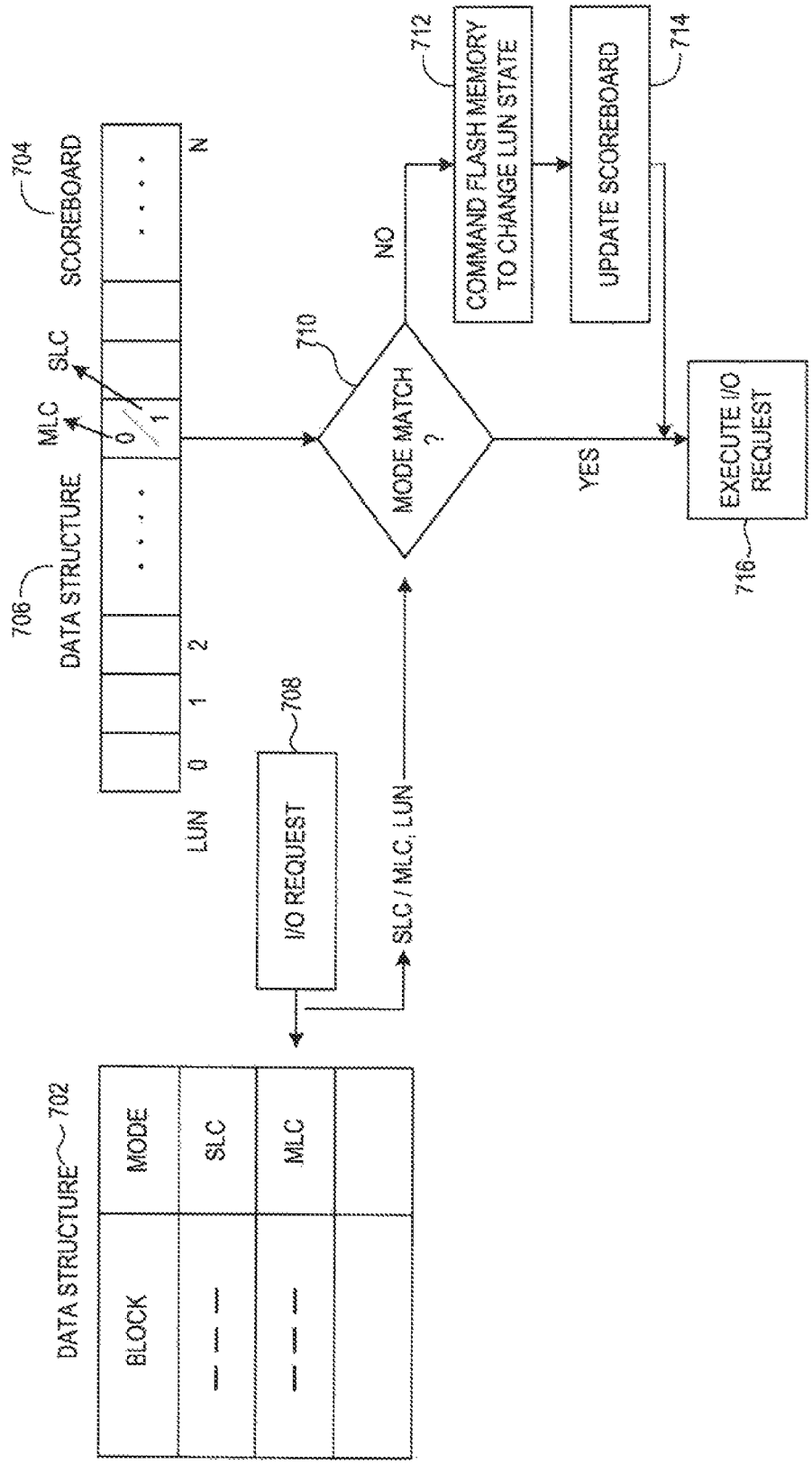
FIG. 7 is a data structure and action diagram depicting flash memory mode matching for an I/O request taking place in the storage system of FIG. 6 in accordance with some embodiments.

FIG. 7 is a data structure and action diagram depicting flash memory mode matching for an I/O request 708 taking place in the storage system of FIG. 6. Data structures 702, 706 and actions are described below for embodiments of the storage cluster 160 shown in FIGS. 1-6, and blocks 620 and LUNs 616. Embodiments for other types of storage systems, other locations for data structures and processors, and other portions of flash memory 206 are readily devised in keeping with the teachings herein. The I/O request 708 could be for reading or writing user data or metadata at a specified location in flash memory 206, and could originate from a processor 602 of one of the storage nodes 150, or a processor 608 of the same storage unit 152 that has the flash memory 206 with the specified location, or a differing storage unit 152. These data structures 702, 706 could be implemented as lists, databases, tables, etc., in one or both of the data structures 604, 610 of FIG. 6. Other information, e.g., further metadata, could be implemented in one or both of the data structures 702, 706. The data structures 702 could be integrated with addressing schemes or other information about memory, and could even be combined in some embodiments.

With reference to FIGS. 6 and 7, a processor 602 parses the I/O request 708, and finds out to which block 620 of flash memory 206 the I/O request 708 pertains. For example, this could relate to an addressing scheme or addressing indirection. The I/O request 708 could relate to reading or writing data at a specified address, and the processor 602 could determine this address is in a specific block 620. Accessing the data structure 702, the processor 602 determines which flash memory mode 622 is desired for the block 622 of flash memory 206. Since the flash memory 206 packages 614 maintain flash memory mode 622 at the LUN 616 level, and the entire LUN 616 that has the block 622 of interest may have been set to another flash memory mode 622 for another I/O access or other storage system operation, the block 622 may or may not be in the desired flash memory mode for the present I/O request 708.

Once the desired flash memory mode 622 for the block 620 of interest for the I/O request 708 is determined and communicated (e.g., to a register, memory location, another processor, etc.), the processor 608 of the storage unit 152 determines which LUN 616 corresponds to the block 620 of interest. This could involve looking up in an address translation table, or otherwise analyzing addresses in an addressing scheme. Then, the processor 608 in the storage unit 152 accesses a data structure 706, in one embodiment a scoreboard 704, and determines in which flash memory mode 622 the LUN 616 presently operates. The processor 608 in the storage unit 152 performs a comparison, in the mode match determination action 710 to determine whether the desired flash memory mode 622 matches the present flash memory mode 622 for the LUN 616. If the answer is yes, the flash memory mode 622 matches, the processor 608 executes the I/O request 708, in an action 716. If the answer is no, the flash memory modes 622 do not match, the processor 608 in the storage unit 152 commands the flash memory to change LUN state to the desired flash memory mode 622, in an action 712, and updates the scoreboard 704, in an action 714. With the update, the scoreboard 704 indicates the present flash memory mode 622 of the LUN 616 that has the block 622 of interest. Then, the processor 608 executes the I/O request 708, in the action 716. For example, this could be reading or writing to a memory location in the block 622 of interest, in the LUN 616 with the desired flash memory mode 622.

Figure 8:
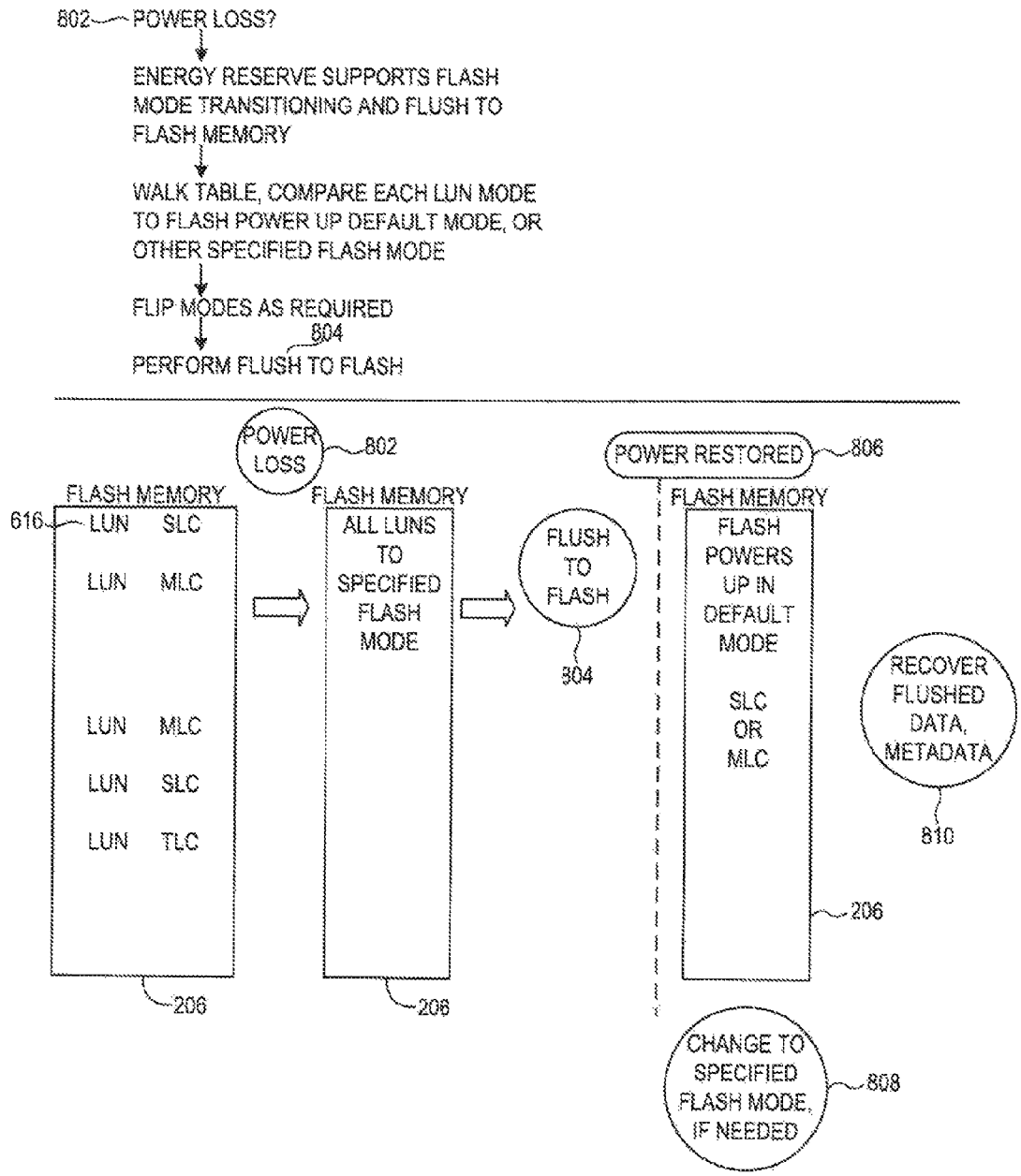
FIG. 8 is a flash memory and action diagram depicting power loss events taking place in the storage system of FIG. 6, using the flash memory mode matching and data structures of FIG. 7 in accordance with some embodiments.

FIG. 8 is a flash memory and action diagram depicting power loss events taking place in the storage system of FIG. 6, using the flash memory mode matching and data structures 702, 706 of FIG. 7. Various embodiments of the storage cluster 160 flush the contents of the NVRAM 204 to flash memory 206 when a power loss 802 occurs, and the problem arises that the various portions of flash memory 206 are likely not all in a desired flash memory mode 622 for the flush. For example, it may be desired that the flash memory mode 622 for targeted portions of flash memory 614 for the flush be in single level cell mode. And, the system has been writing to and reading from various blocks and has set the flash memory mode 622 for various LUNs 616 to some combination of single level cell mode and one or more multilevel cell modes. That is, in a targeted area of flash memory 614, one LUN 616 could be in single level cell mode, another LUN 616 could be in a multilevel cell mode, etc., but it is desired to do a flush to specified locations in flash memory 206 and have those locations be in single level cell mode for the flush. In order to accomplish this, the storage system accesses or consults the data structure 706, and changes flash memory mode 622 in the targeted portions of flash memory 206 as needed. This is discussed in more detail below.

In FIG. 8, the leftmost depiction of the flash memory 206 shows various LUNs 616 in various flash memory modes 622. This is for purposes of illustration only, and the state of flash memory mode 622 in a particular flash memory 206 is system and situation dependent, and could include single level cell mode and one or more multilevel cell modes, but does not necessarily include all of the modes shown or the particular order of modes shown here. In this scenario, a power loss 802 occurs, and the system behaves as described in the drawing. An energy reserve supports flash mode transitioning and flush to flash memory. As shown in FIGS. 3 and 6, the energy reserve (e.g., battery backup or super capacitor) provides power to the processor 608 and the DRAM 216 as NVRAM 204 in the storage unit 152 when power is lost, and has sufficient capacity to do so during the flash mode transitioning and the flush.

The storage system walks the table. For example the processor 608 in the storage unit 152 consults the data structure 706, and compares each LUN 616 flash memory mode 622 to a specified flash memory mode 622 for the flush. This could be the same as the flash power up default mode, or could be different. For example, some storage systems could come up in single level cell mode and use single level cell mode for the flush, and other systems could come up in a multilevel cell mode, but use single level cell mode for the flush. Or, a system could come up in single level cell mode, but use a multilevel cell mode for the flush. A system could even come up in a higher multilevel cell mode, and use a lower multilevel cell mode for the flush. After comparing each LUN 616 flash memory mode 622 to the specified flash mode, the system flips the flash memory modes 622 as required. This can be performed as an iterative operation, repeating a determination of whether a logical unit number 616 matches a specified flash memory mode 622 for the flush and sending a command to change the memory mode of the logical unit number 616 if needed, for all of the logical unit numbers 616 involved in a data flush to flash memory 206. The second from the left depiction of flash memory 206 shows all LUNs (e.g., of a targeted portion of flash memory 206 for the flush) are in a specified flash mode for the flush. Once the flash memory modes 622 for the targeted LUN's 616 are set to the specified flash memory mode 622, the system performs the flush to flash, in the action 804. This could be done by reading from the DRAM 216 and writing to the flash memory 206, or using a direct memory access transfer, e.g., with DMA 214 as shown in FIG. 3.

With power restored 806 following the power loss event, the flash memory 206 powers up in a default mode, which could be single level cell or one of the multilevel cell modes, for example. In an action 808, the flash memory mode 622 is changed to the specified flash memory mode used for the flush, if needed, at least for each LUN 616 involved in the flush and recovery (e.g., if the specified mode is not the same as the default mode of power up flash memory). After the action 808, in an action 810, the flushed data and metadata are recovered. For example, the processor 608 could read from the flash memory 206 and write to the DRAM 216, restoring data and metadata to the NVRAM 204. With the recovered data and metadata, system operation resumes.

With reference to FIGS. 6-8, comparison of the above-described embodiments with flash memory mode matching to less sophisticated storage systems lacking the mode matching shows improvements and benefits. Depending on the flash memory vendor, some vendors make transitioning flash memory mode a simple transition, where a command is sent and once the command is done the device exists in the selected flash memory mode 622. Other vendors require a sequence of commands to move a flash memory device from one mode to the other. With either of these, every time an I/O command comes in the less sophisticated storage system lacking mode matching would send a command or sequence of commands to move the flash memory device into the desired flash memory mode 622. This would increase communication bandwidth considerably, in comparison to the above-described embodiments, which only send a command or sequence of commands to move the flash memory device into the desired flash memory mode 622 in those circumstances when the portion of flash memory 206 to which the I/O request is directed is not in the desired flash memory mode 622. It is thus much more efficient to keep track of the state that the flash memory devices are in, and upon receipt of a command, choose whether or not to transition the flash memory state based on the present state. In the power loss and data flush scenario of FIG. 8, the additional time cost for the otherwise unnecessary commands or sequences of commands to change flash memory mode 622 in LUNs 616 that are already in the desired flash memory mode 622 would necessitate a larger energy reserve 218.

Figure 9:
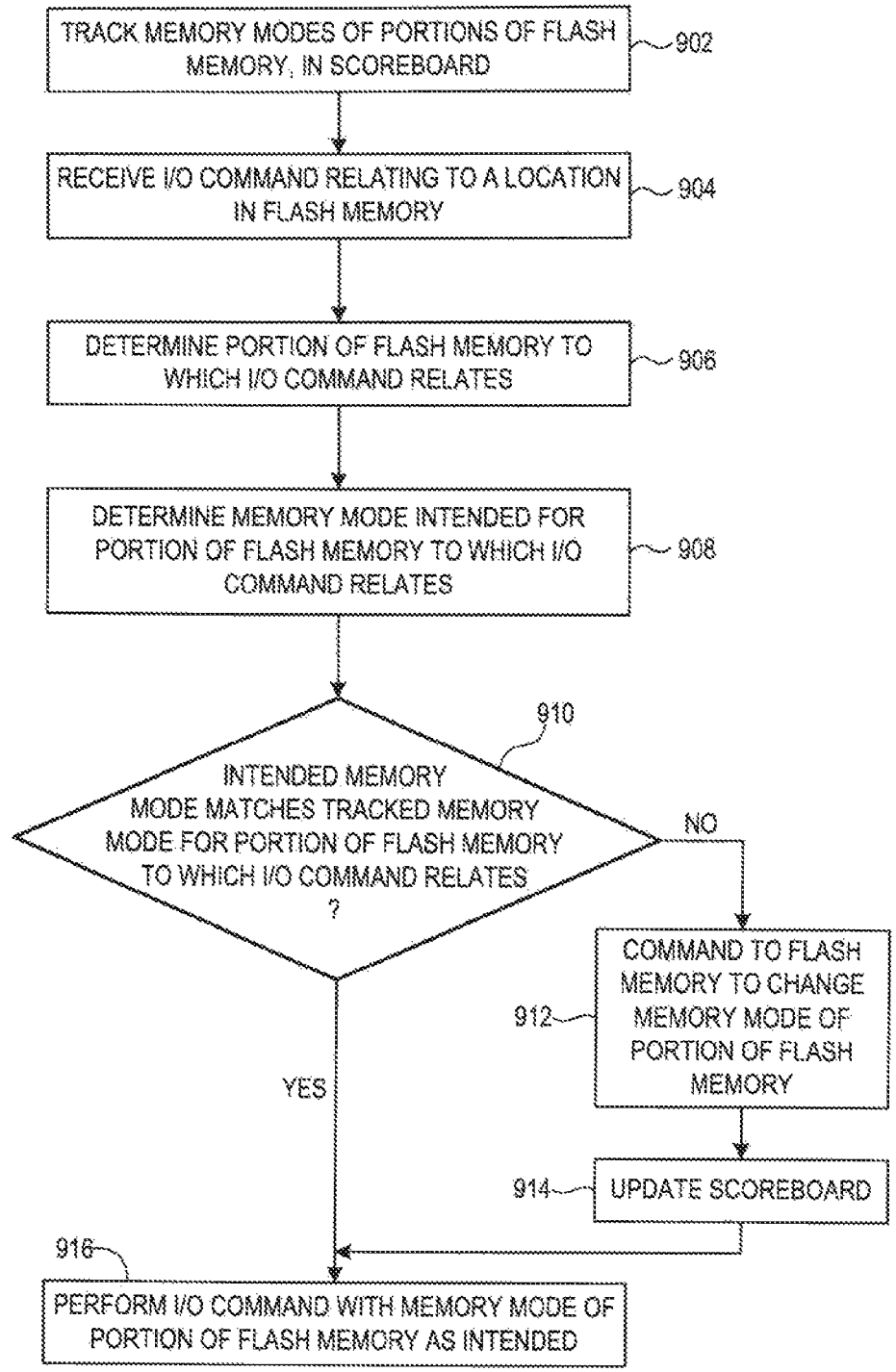
FIG. 9 is a flow diagram of a method for tracking and transitioning flash memory modes, which can be practiced in the storage cluster of FIGS. 1-8, in accordance with some embodiments.

FIG. 9 is a flow diagram of a method for tracking and transitioning flash memory modes, which can be practiced in the storage cluster of FIGS. 1-8, in accordance with some embodiments. Some or all of the actions in the method can be performed by various processors, such as processors in storage nodes or processors in storage units. In an action 902, memory modes of portions of flash memory are tracked in a scoreboard. The scoreboard could be implemented in a data structure, tracking flash memory modes of logical unit numbers of flash memory, as described above with reference to FIGS. 6 and 7, or other portions of flash memory according to granularity of flash memory support for operating modes. The flash memory modes include two or more types of flash memory modes, such as single level cell (one bit per cell of flash memory), multilevel cell, e.g., two bits per cell, three bits per cell, four bits per cell, etc. An I/O command is received in an action 904. The I/O command relates to a location in flash memory, which could be in a block for example.

In an action 906, the portion of flash memory to which the I/O command relates is determined. This portion could correspond to one of the portions of flash memory that are tracked in the scoreboard as to flash memory modes, e.g., an LUN, or could be a finer grained portion, e.g., a block.

In an action 908, the memory mode intended for the portion of flash memory to which the I/O command relates is determined. This can be accomplished by looking up in another data structure, for example one that assigns flash memory mode to ranges of addresses, portions of memory, or types of data, etc. One suitable data structure indicates flash memory mode for blocks of flash memory.

In a decision action 910, it is determined whether the intended memory mode matches the tracked memory mode, for the portion of flash memory to which the I/O command relates. This determination is performed by comparing the intended memory mode and the tracked memory mode. If the answer is yes, the intended memory mode matches the tracked memory mode for the portion of flash memory to which the I/O command relates, flow proceeds to the action 916, and an I/O command is performed, with the memory mode of the portion of flash memory as intended. This is in the absence of changing the memory mode, since the memory mode does not need to be changed. If the answer is no, the intended memory mode does not match the tracked memory mode for the portion of flash memory to which the I/O command relates, flow proceeds to the action 912. In the action 912, a command is sent to flash memory to change the memory mode of the portion of flash memory. For example, if the I/O command relates to a block in flash memory, and the flash memory of a logical unit number that includes that block does not match, the command could be sent to flash memory to change the memory mode of the logical unit number, which includes changing the memory mode of the block of flash memory. The scoreboard is updated, in an action 914, to show the new, changed memory mode. This can be done by writing to a data structure. After the memory mode is changed, flow proceeds to the action 916, to perform the I/O command with the memory mode of the portion of flash memory as intended.

Figure 10:
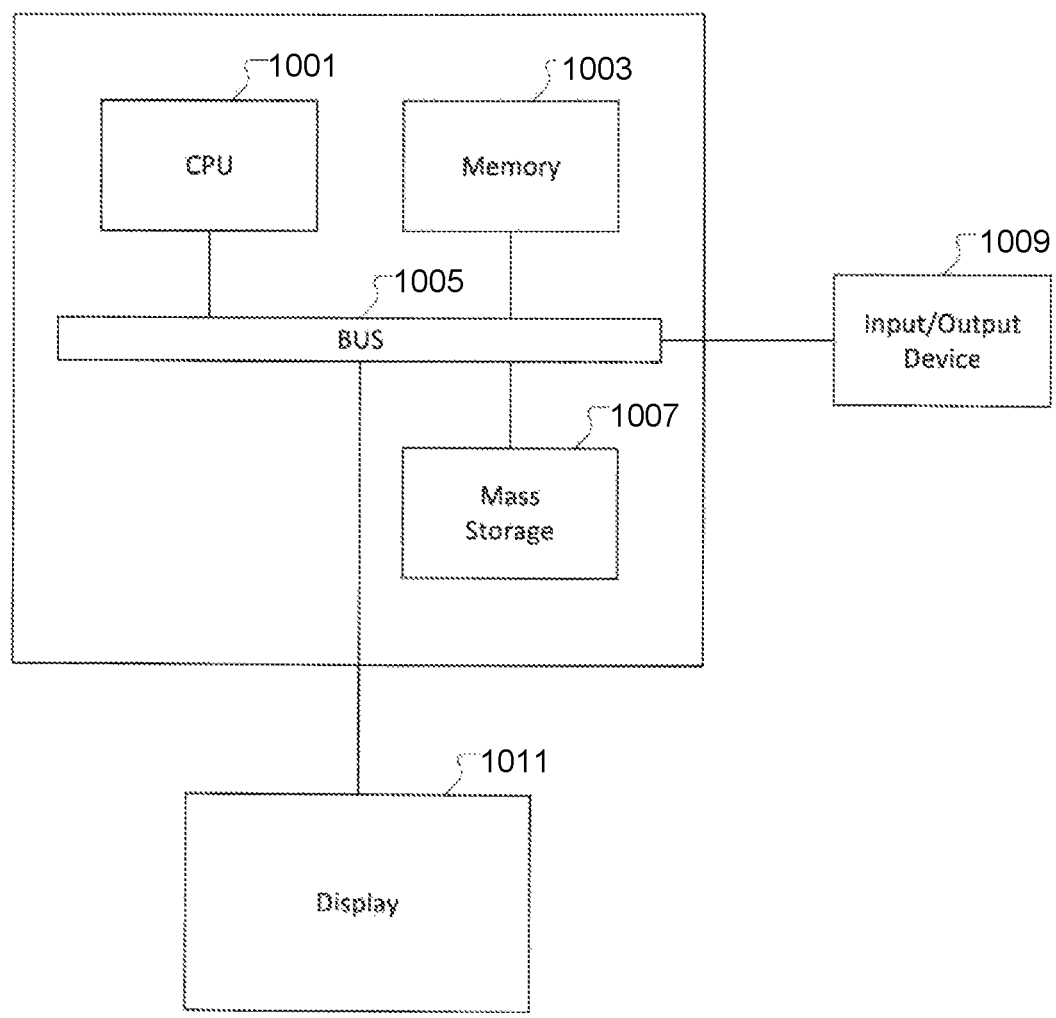
FIG. 10 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 10 is an illustration showing an exemplary computing device which may implement the embodiments described herein. The computing device of FIG. 10 may be used to perform embodiments of the functionality for the flash mode tracking and transitioning in accordance with some embodiments. The computing device includes a central processing unit (CPU) 1001, which is coupled through a bus 1005 to a memory 1003, and mass storage device 1007. Mass storage device 1007 represents a persistent data storage device such as a floppy disc drive or a fixed disc drive, which may be local or remote in some embodiments. Memory 1003 may include read only memory, random access memory, etc. Applications resident on the computing device may be stored on or accessed via a computer readable medium such as memory 1003 or mass storage device 1007 in some embodiments. Applications may also be in the form of modulated electronic signals modulated accessed via a network modem or other network interface of the computing device. It should be appreciated that CPU 1001 may be embodied in a general-purpose processor, a special purpose processor, or a specially programmed logic device in some embodiments.

Display 1011 is in communication with CPU 1001, memory 1003, and mass storage device 1007, through bus 1005. Display 1011 is configured to display any visualization tools or reports associated with the system described herein. Input/output device 1009 is coupled to bus 1005 in order to communicate information in command selections to CPU 1001. It should be appreciated that data to and from external devices may be communicated through the input/output device 1009. CPU 1001 can be defined to execute the functionality described herein to enable the functionality described with reference to FIGS. 1-9. The code embodying this functionality may be stored within memory 1003 or mass storage device 1007 for execution by a processor such as CPU 1001 in some embodiments. The operating system on the computing device may be MS DOS™, MS-WINDOWS™ OS/2™, UNIX™, LINUX™, or other known operating systems. It should be appreciated that the embodiments described herein may also be integrated with a virtualized computing system implemented with physical computing resources.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for tracking and transitioning flash memory modes, performed by a storage system, comprising:
   tracking memory modes of a plurality of portions of flash memory, on a per portion basis, in a first data structure in a first memory;
   tracking memory mode of a plurality of differing portions of flash memory, at a level differing from the portions of flash memory, in a second data structure or portion of the first data structure;
   determining whether the tracked memory mode of a portion of flash memory, based on the first data structure, matches the tracked memory mode of one of the plurality of differing portions of flash memory, based on the second data structure or portion of the first data structure, for an I/O (input/output) command relating to the flash memory;
   sending at least one command to the flash memory to change the memory mode of the portion of flash memory, responsive to determining the tracked memory mode of the portion of flash memory does not match the memory mode of the one of the plurality of differing portions of flash memory for the I/O command; and
   performing the I/O command with the memory mode of the portion of flash memory changed to match the memory mode for the I/O command.

2. The method of claim 1, further comprising:
   updating the data structure to indicate the memory mode of the portion of flash memory, responsive to the sending of the at least one command to the flash memory to change the memory mode.

3. The method of claim 1, wherein:
   the data structure includes a scoreboard;
   the memory modes include single level cell (SLC) and one or more types of multiple level cell (MLC);
   each portion of flash memory is a logical unit number (LUN);
   each of the plurality of differing portions is a block of flash memory; and
   the first memory has an energy reserve.

4. The method of claim 1, wherein:
   the I/O command relates to flushing data to the flash memory in response to a power loss; and
   the memory mode for the I/O command is a memory mode for flash memory specific to flushing data in response to the power loss.

5. The method of claim 1, further comprising:
   repeating the determining and the sending for a sufficient amount of the flash memory to perform a flushing of data to the flash memory, wherein the I/O command relates to the flushing of data to the flash memory.

6. The method of claim 1, further comprising:
   performing a further I/O command relating to a further portion of flash memory, responsive to determining the tracked memory mode of the further portion of flash memory matches a memory mode for the further I/O command, based on the data structure, without commanding the flash memory regarding the memory mode of the further portion of flash memory.

7. The method of claim 1, further comprising:
   consulting the second data structure or portion of the first data structure as a further data structure that associates blocks of flash memory with memory mode, to determine the memory mode for the I/O command.

8. A tangible, non-transitory, computer-readable media having instructions thereupon which, when executed by a processor, cause the processor to perform a method comprising:
   tracking, in a data structure, memory modes of portions of flash memory;
   tracking, in the data structure or a further data structure, memory modes of a plurality of differing portions of flash memory, at a level differing than the portions of flash memory;
   comparing a tracked memory mode of a portion of flash memory, from the data structure, to a tracked memory mode, from the data structure or the further data structure, for an I/O (input/output) command relating to one of the plurality of differing portions of flash memory that is within the portion of flash memory;
   commanding the flash memory to change the memory mode of the portion of flash memory, responsive to a determination that the tracked memory mode of the portion of flash memory mismatches the memory mode for the I/O command; and
   performing the I/O command on the flash memory, responsive to the memory mode of the portion of flash memory changed to the memory mode for the I/O command.

9. The computer-readable media of claim 8, wherein the method further comprises:
   writing the memory mode of the portion of flash memory to the data structure as an update, responsive to the commanding.

10. The computer-readable media of claim 8, wherein:
    the tracking in the data structure comprises using a scoreboard;
    the memory modes includes at least two of single level cell (SLC), multiple level cell (MLC), triple level cell (TLC), quad level cell (QLC), and further types of flash memory; and
    the keeping track of the memory modes of portions of flash memory comprises keeping track of the memory modes of logical unit numbers (LUNs).

11. The computer-readable media of claim 8, wherein:
    the method further comprises repeating the comparing and the commanding for a plurality of portions of flash memory, responsive to a power loss;
    the I/O command relates to flushing data to the flash memory; and
    the memory mode for the I/O command is a specific memory mode for the flushing data to the flash memory.

12. The computer-readable media of claim 8, wherein the method further comprises:
    performing a further I/O command relating to a further portion of flash memory, responsive to a comparison showing that the tracked memory mode of the further portion of flash memory, from the data structure, matches a memory mode for the further I/O command.

13. The computer-readable media of claim 8, wherein the method further comprises:
    determining the memory mode for the I/O command, based on a further data structure associating blocks of flash memory and memory mode; and
    communicating the determined memory mode for the I/O command as a memory mode of a block of flash memory, wherein the tracked memory mode to which the determined memory mode for the I/O command is compared comprises a memory mode of a logical unit number (LUN) of flash memory.

14. A storage system that tracks and transitions flash memory modes, comprising:
- flash memory;
- a first memory, configurable to hold a data structure; and
- at least one processor, configurable to perform a method comprising:
    - tracking, in the data structure, memory modes of logical unit numbers (LUNs) of the flash memory;
    - tracking, in the data structure or a further data structure, memory modes of blocks of the flash memory;
    - consulting at least the data structure to determine whether there is a match of the tracked memory mode of a block of the flash memory, according to the data structure or the further data structure, for an I/O (input/output) command relating to the block of the flash memory, and the tracked memory mode of the LUN that includes the block of the flash memory, according to the data structure;
    - communicating to the flash memory to change the memory mode of the LUN that includes the block of the flash memory, responsive to determining there is not a match of the memory mode for the I/O command and the tracked memory mode of the LUN that includes the block of the flash memory; and
    - performing the I/O command on the block of the flash memory, subsequent to the change of the memory mode of the LUN to match the memory mode for the I/O command.

15. The storage system of claim 14, wherein the tracking comprises:
- writing the memory mode of the LUN to the data structure, responsive to the commanding the flash memory to change the memory mode of the LUN.

16. The storage system of claim 14, further comprising:
- an energy reserve coupled to the flash memory and the first memory.

17. The storage system of claim 14, wherein the method further comprises:
- consulting the data structure to determine whether the memory mode for each of a plurality of LUNs of the flash memory matches a specific memory mode for flushing data to the flash memory; and
- communicating to the flash memory to change the memory mode of each of the plurality of LUNs that does not match the specific memory mode for flushing data to the flash memory, responsive to a power loss.

18. The storage system of claim 14, wherein the at least one processor is further configurable to repeat the consulting and the communicating for a plurality of LUNs sufficient for a flushing of data to the flash memory.

19. The storage system of claim 14, wherein the method further comprises:
- performing a further I/O command on a further block of the flash memory, in absence of changing the memory mode of the further block of the flash memory, responsive to determining there is a match of the memory mode for the further I/O command and the tracked memory mode of the further block of the flash memory.

20. The storage system of claim 14, further comprising:
- the first memory or a second memory configurable to hold the further data structure that associates blocks of flash memory with memory mode; and
- the one or more processors further configured to consult the further data structure to determine the memory mode for the I/O command.

\* \* \* \* \*